US010863361B2

(12) United States Patent
Zhao et al.

(10) Patent No.: US 10,863,361 B2
(45) Date of Patent: Dec. 8, 2020

(54) ELECTRONIC DEVICE, WIRELESS COMMUNICATION METHOD AND COMPUTER READABLE MEDIUM

(71) Applicant: Sony Corporation, Tokyo (JP)

(72) Inventors: Youping Zhao, Beijing (CN); Kangyi Liu, Beijing (CN); Chen Sun, Beijing (CN); Xin Guo, Beijing (CN)

(73) Assignee: SONY CORPORATION, Tokyo (JP)

( * ) Notice: Subject to any disclaimer, the term of this patent is extended or adjusted under 35 U.S.C. 154(b) by 66 days.

(21) Appl. No.: 16/202,117

(22) Filed: Nov. 28, 2018

(65) Prior Publication Data

US 2019/0274052 A1    Sep. 5, 2019

(30) Foreign Application Priority Data

Mar. 5, 2018 (CN) .......................... 2018 1 0178802

(51) Int. Cl.
| | |
|---|---|
| *H04W 4/00* | (2018.01) |
| *H04W 16/04* | (2009.01) |
| *H04W 28/22* | (2009.01) |
| *H04W 28/02* | (2009.01) |
| *H04W 28/20* | (2009.01) |
| *H04W 28/08* | (2009.01) |
| *H04W 72/04* | (2009.01) |
| *H04W 88/08* | (2009.01) |
| *H04W 16/22* | (2009.01) |
| *H04W 84/00* | (2009.01) |
| *H04W 28/18* | (2009.01) |
| *H04B 1/69* | (2011.01) |

(52) U.S. Cl.
CPC .............. *H04W 16/04* (2013.01); *H04B 1/69* (2013.01); *H04W 16/22* (2013.01); *H04W 28/0236* (2013.01); *H04W 28/08* (2013.01); *H04W 28/18* (2013.01); *H04W 28/20* (2013.01); *H04W 28/22* (2013.01); *H04W 72/0453* (2013.01); *H04W 72/0486* (2013.01); *H04W 72/0493* (2013.01); *H04W 84/005* (2013.01); *H04W 88/08* (2013.01)

(58) Field of Classification Search
CPC ........ H04B 1/69; H04W 16/04; H04W 16/22; H04W 28/0236; H04W 28/08; H04W 28/18; H04W 28/20; H04W 28/22; H04W 72/0453; H04W 72/0486; H04W 72/0493; H04W 84/005; H04W 88/08
See application file for complete search history.

(56) References Cited

U.S. PATENT DOCUMENTS

| 6,385,454 B1* | 5/2002 | Bahl ...................... H04W 28/26 455/440 |
| 2016/0156393 A1* | 6/2016 | Chen ................... H04W 72/085 370/329 |
| 2019/0261221 A1* | 8/2019 | Henry ................... G06N 20/00 |

* cited by examiner

*Primary Examiner* — Minh Trang T Nguyen
(74) *Attorney, Agent, or Firm* — Xsensus LLP

(57) ABSTRACT

The disclosure relates to an electronic device for wireless communication, a wireless communication method and a computer readable medium. According to an embodiment, an electronic device for wireless communication includes a processing circuitry. The processing circuitry is configured to acquire a parameter related to a behavior characteristic of a mobile access point. The processing circuitry is further configure to determine a spectrum allocation manner for the mobile access point based on the parameter.

18 Claims, 13 Drawing Sheets

ELECTRONIC DEVICE, WIRELESS COMMUNICATION METHOD AND COMPUTER READABLE MEDIUM

CROSS REFERENCE TO RELATED APPLICATION

This application claims priority to Chinese Patent Application No. 201810178802.X, filed on 5 Mar. 2018, the entire contents of which being incorporated herein by reference.

FIELD

The present disclosure generally relates to the field of wireless communication, and in particular to an electronic device for wireless communication, a wireless communication method and a computer readable medium.

BACKGROUND

With the increasing wide application of mobile Internet services and the massive use of terminal devices such as smart phones and tablet computers, mobile data traffics are growing rapidly, which results in the shortage of wireless spectrum resources. In order to improve utilization efficiency of spectrum resources, dedicated spectrum can be changed to be shared spectrum in a spectrum management mode. To this end, the spectrum may be divided into multiple frequency resource blocks, an effective sharing by different levels of wireless services shall be ensured while there is no impact on the original service system, to improve spectrum utilization efficiency.

For example, the Federal Communications Commission (FCC) has proposed a mechanism for managing and using authorization for three-layer mobile access points and interference management in the 3.5 GHz band, which includes a dynamic database including geographic information and a spectrum access system for managing potential interference. FIG. 5 shows an exemplary structure of the system, which includes a FCC database, a spectrum access system (SAS). Domain Proxy, an element management system (EMS) (optional), a citizens broadband radio service device (CBSD), an interface between SASs, and an interface between an SAS and a user. In addition, the schematic diagram of the system also shows processing such as informing incumbent, incumbent detection (environmental sensing capability (ESC)), and CBSD sensing (optional).

SUMMARY

It is realized by the inventor that, with the mobility of mobile access points and rapid change of traffic requirements, a large amount of overhead for the spectrum access system (SAS) will be caused. Therefore, a method used for reducing the overhead of the spectrum access system is required. In addition, the behavior characteristic and tendency of mobile access points, and the impact of the mobile access points on the overhead of the system are not taken into account in the conventional overhead control technology.

A brief description of the embodiments of the present disclosure is provided below to provide basic understanding for certain aspects of the present disclosure. It should be understood that the following overview is not an exhaustive overview of the present disclosure. It is neither intended to determine critical or important aspects of the present disclosure nor intended to limit the scope of the present disclosure. An object of the overview is only to give some concepts in a simplified manner, which serves as a preface of the more detailed description described later.

An electronic device for wireless communication is provided according to an embodiment, which includes a processing circuitry. The processing circuitry is configured to acquire a parameter related to a behavior characteristic of a mobile access point. The processing circuitry is further configured to determine a spectrum allocation manner for the mobile access point based on the parameter.

A wireless communication method is provided according to another embodiment, which includes a step of acquiring a parameter related to a behavior characteristic of a mobile access point. The method further includes a step of determining a spectrum allocation manner for the mobile access point based on the parameter.

A computer readable medium is further provided according to an embodiment of the present disclosure, which includes executable instructions. When executed by an information processing apparatus, the executable instructions cause the information processing apparatus to execute the method according to the embodiment of the present disclosure.

The embodiments of the present disclosure are benefit for reducing the overhead or the access number of the spectrum access system.

BRIEF DESCRIPTION OF THE DRAWINGS

The present disclosure can be better understood with reference to description given hereinafter in conjunction with the accompanying drawings, in which, identical or similar reference numerals are used to designate the same or similar components. The accompanying drawings together with the detailed description below are incorporated in the specification and form a part of the specification, and are used to further exemplify preferred embodiments of the present disclosure and explain the principle and advantages of the present disclosure. In the accompanying drawings.

DETAIL DESCRIPTION OF EMBODIMENTS

The embodiments of the present disclosure are described below with reference to the accompanying drawings. An element and a feature shown in one of the accompanying drawings or one embodiment of the present disclosure may be combined with an element and a feature shown in one or more other drawings or embodiments. It should be noted that representations and description of components and processing which are irrelevant to the present disclosure and known to those skilled in the art are omitted in the accompanying drawings and the specification for clarity.

Before describing the embodiment, an application scenario of the embodiment is briefly described with reference to an example shown in FIG. 6.

Figure 6:
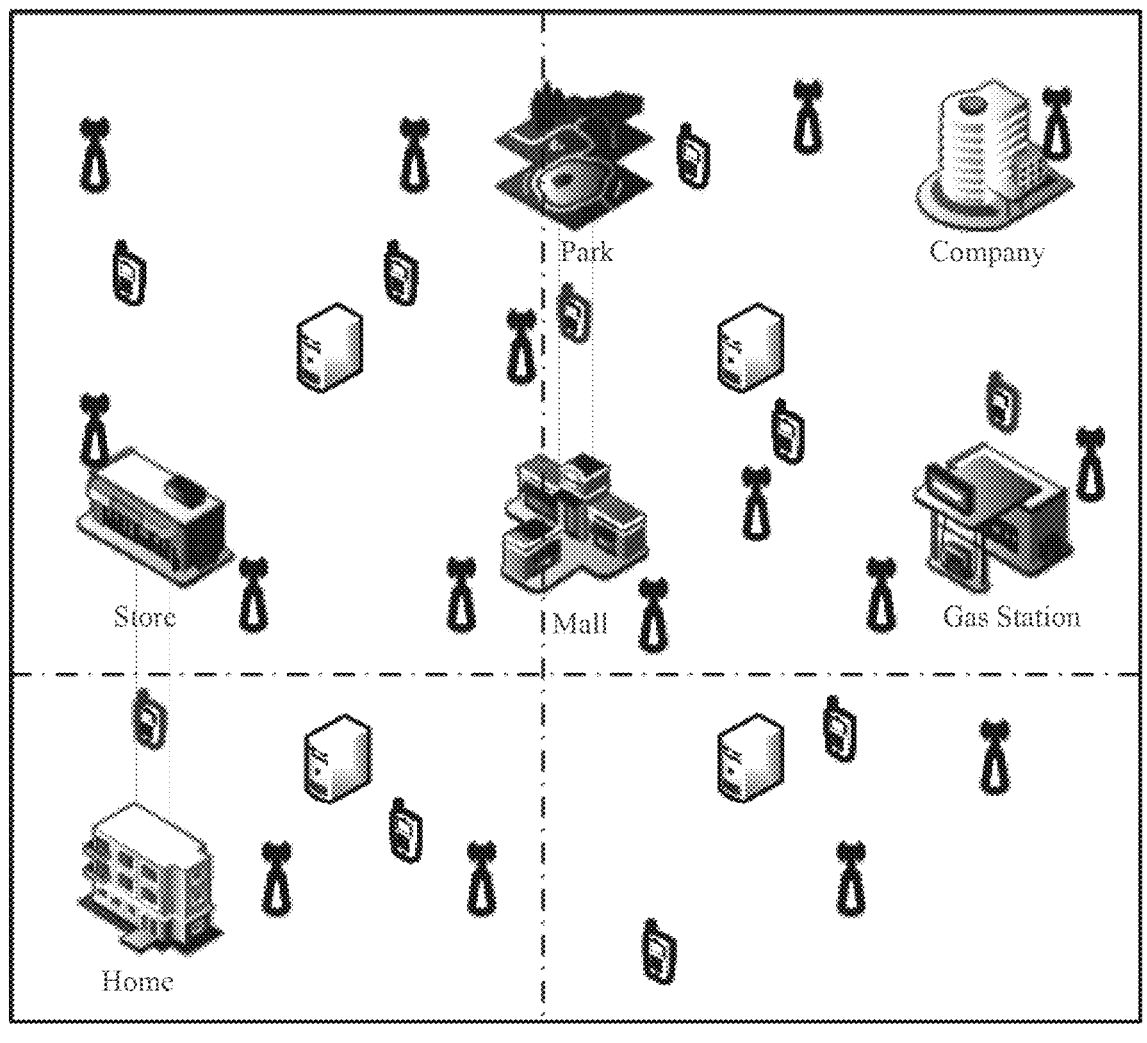
FIG. 6 is a schematic diagram for illustrating an application scenario according to an embodiment of the present disclosure.

The exemplary scenario shown in FIG. 6 shows wireless access points such as a citizens broadband radio service device (CBSD), a user equipment (UE) (which may include, for example, an incumbent access user, a priority access license (PAL) user and a general authorized access (GAA) user), and a spectrum management device (such as a co-existence Manager (CxM) or a spectrum access system (SAS) device) at different locations.

In addition, a historical behavior of the mobile access points can be recorded in the system. Due to the mobility of mobile access points and a change in a spectrum requirement the mobile access point may frequently access to different SAS databases to query an available spectrum resulting in a large amount of overhead of the system.

Figure 1:
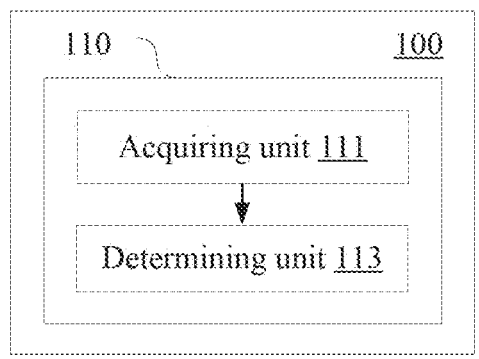
FIG. 1 is a block diagram showing a configuration example of an electronic device for wireless communication according to an embodiment of the present disclosure.

As shown in FIG. 1, an electronic device 100 for wireless communication according to an embodiment includes a processing circuitry 110. The processing circuitry 110 may be implemented as a specific chip, a chipset or a central processing unit (CPU) or the like.

The processing circuitry 110 includes an acquiring unit 111 and a determining unit 113. It should be noted that, although the acquiring unit 111 and the determining unit 113 are shown as functional blocks in FIG. 1, it should be understood that the functions of the acquiring unit 111 and the determining unit 113 may also be realized as a whole by the processing circuitry 110, rather than being realized by discrete components of the processing circuitry 110. In addition, although the processing circuitry 110 is shown as one block in FIG. 1, the electronic device 100 may include multiple processing circuitries. The functions of the acquiring unit 111 and the determining unit 113 may be realized by the multiple processing circuitries, so that die functions are realized under the cooperation of the multiple processing circuitries.

The electronic device according to the embodiment may, for example, be implemented on a spectrum management device side, or may be implemented on a mobile access point side.

For example, a spectrum management device may include a CxM or a device arranged on the SAS side. In addition, a mobile access point may include, for example, a CBSD or a UE.

The acquiring unit 111 is configured to acquire a parameter related to a behavior characteristic of a mobile access point.

The determining unit 113 is configured to determine a spectrum allocation manner for the mobile access point based on the parameter acquired by the acquiring unit 111. According to an embodiment, the determining unit 113 is further configured to determine an access manner to the spectrum access system based on the parameter acquired by the acquiring unit 111.

The parameter acquired by the acquiring unit 111 may be determined based on one or more of the following information of the mobile access point: an identifier (ID), a position, a moving speed, a tune of making a spectrum request, and data traffic within a time period between spectrum requests. However, the present disclosure is not limited thereto.

For example, the parameter related to the behavior characteristic of the mobile access point may include a parameter related to mobility of the mobile access point.

More specifically, the parameter related to the mobility may include a normalized eigenvalue of a transfer matrix of the mobile access point. Elements of the transfer matrix correspond to probabilities of transferring of the mobile access point between corresponding spectrum management devices.

The parameter related to the mobility of the mobile access point and a manner of acquiring the parameter are described hereinafter with reference to specific examples.

It is assumed that there are in SAS databases and n spectrum management devices (such as CxM) in an area. In a case that the mobile access point (CBSD) moves between management areas of CxMs, the mobile access point may record the spectrum management devices (the CxM and the SAS) to which it belongs at different times, and with which a location transfer probability matrix of transferring of the CBSD between CxMs and SASs may be established. The above process may be performed on the CBSD side, without increasing overhead of the SAS.

For example, the location transfer probability matrix may be calculated in the following manner. Probabilities of occurrence of the CBSD in corresponding CxM and SAS at this moment are calculated according to historical locations of the CBSD at the same moment, and a transfer probability is calculated according to historical locations of the CBSD at a next moment, to obtain a transfer probability matrix at this moment. The transfer probability matrix is expressed as, for example, the following formula (1).

$$P_A(t) = \begin{bmatrix} P_{11}(t) & \cdots & P_{n1}(t) \\ \vdots & \ddots & \vdots \\ P_{n1}(t) & \cdots & P_{nn}(t) \end{bmatrix} \quad \text{Formula (1)}$$

in which, $P_A(t)$ represents a transfer matrix, an element $P_G$ in the matrix represents a probability of transferring of the mobile access point between a spectrum management device i and a spectrum management device j, and t represents time.

In particular, in order to obtain the transfer probability matrix of the CBSD transferring between the SASs, transferring of CBSD between different CxMs in a same SAS may be combined as appropriate, or the probabilities of transferring of the CBSD between different CxMs in a same SAS may be placed in neighboring positions A sum of the probabilities for the same SAS corresponding to the CxMs is calculated when necessary. In this way, not only transfer information on transferring of the CBSD between SASs may be stored, but also transfer information on transferring of the CBSD between CxMs may be stored.

After the transfer probability matrix is obtained, a normalized eigenvalues may be calculated in an exemplary manner as follows.

It is assumed that the eigenvalues of the matrix $P_A(t)$ are $\{\lambda_1, \lambda_2, \ldots, \lambda_n\}$ respectively, a sum S of the normalized eigenvalues may be represented as:

$$S = \frac{1}{\max\{|\lambda_1|, |\lambda_2|, \ldots, |\lambda_n|\}} \cdot \sum_{i=1}^{n} |\lambda_i| \quad \text{Formula (2)}$$

in which, max { } represents an operation of taking a maximum value.

An integer part of the parameter S can be considered as the number of CxMs to which the mobile access point accesses most frequently. In addition, the eigenvalue vector can indicate an intensity at which the mobile access point accesses to the corresponding CxM.

In addition, the eigenvalues for CxMs belonging to the same SAS may be summed to obtain parameters, which respectively represent the number of SASs to which the mobile access point accesses most frequently and in intensity at which the mobile access point accesses to the corresponding SAS.

Moreover, in consideration of different mobility characteristics of the mobile access in different time periods such as holidays, working days, the parameter related to mobility such as a transfer matrix may also be determined for different time periods respectively.

Accordingly, according to an embodiment, the acquiring unit 111 may be configured to acquire the above parameters for different time periods respectively, and the determining unit 113 may be configured to determine an access manner and/or a spectrum allocation manner of the mobile access point in a target time period, based on the parameter corresponding to the target time period.

Specifically, in a historical record of location of the CBSD, for example, different flag bits may also be used to distinguish historical time periods such as holidays and working days in which behaviors of the mobile access point are largely different from each other. Correspondingly, respective transfer matrices may be determined for different time periods. As an example rather than a limitation, the different time periods described above may include: different time periods (for example, day or night, or early morning, morning, noon, afternoon, dusk, evening, and midnight, or time periods divided by the hour or a finer granularity) of a day; or corresponding days (for example, Monday, Tuesday, . . . Saturday and Sunday) in a week; or working days (Monday to Friday) or rest days (for example, weekends, holidays).

It should be understood that the parameter related to the mobility of the mobile access point in the embodiments of the present disclosure are not limited to the above examples.

In another example, the parameter related to the behavior characteristic of the mobile access point may include a parameter related to a changing rate of a spectrum bandwidth used by the mobile access point.

More specifically, the parameter related to the changing rate may include a shape parameter of a probability distribution of a traffic requirement of the mobile access point. As an examination rather than a limitation, the probability distribution described above may include a generalized Pareto distribution (GPD).

Figure 8:
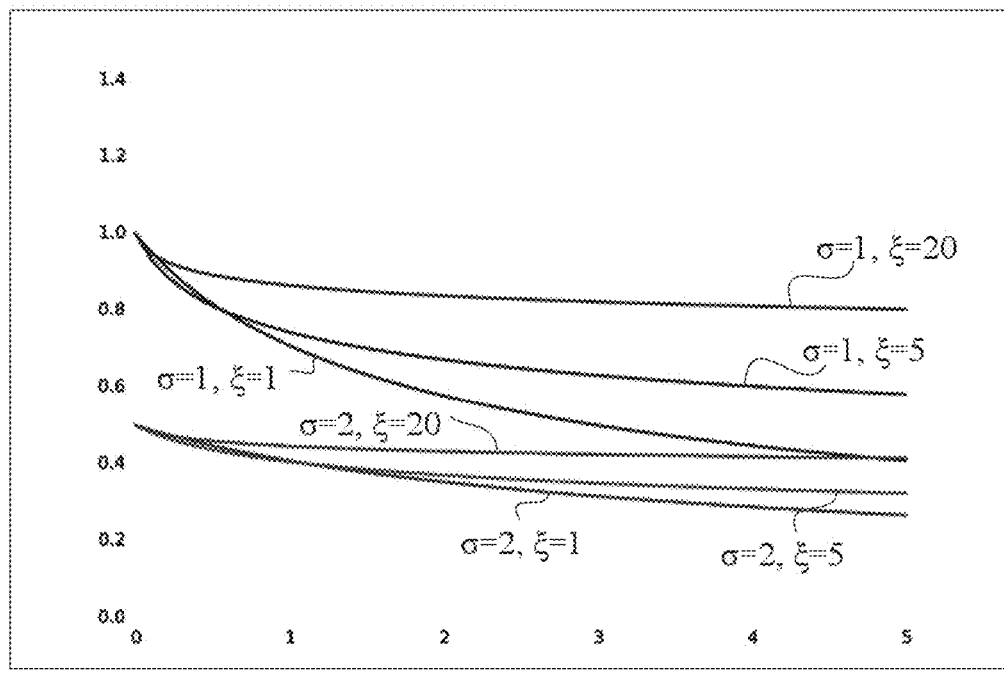
FIG. 8 shows probability distribution functions of the generalized Pareto distributions for different parameter values.

FIG. 8 shows probability distribution functions of the generalized Pareto distribution for different parameter values. The generalized Pareto distributions for different parameter values may be for example heavy-tailed or light-tailed. FIG. 8 is a schematic diagram showing that the generalized Pareto distribution may be a light-tailed distribution or a heavy-tailed distribution. The parameters of the generalized Pareto distribution include a position parameter $\mu$, a scale parameter $\sigma$, and a shape parameter $\xi$. Since the curves are shown together only in a case of the same position parameter, only impact of the scale parameter $\sigma$ and the shape parameter $\xi$ is shown in FIG. 8. A vertical axis of the probability density function in FIG. 8 represents a probability value having no unit, and a horizontal axis represents a value range of a random variable, that is, a value range of a sample value obtained after sampling, which may have no unit. In a practical application, the horizontal axis may, for example, correspond to the size of a data packet generated by the CBSD per unit time, and the unit of the horizontal axis may be Mib (megabytes).

An example of a method for calculating the shape parameter ($\xi$) representing the changing rate of the traffic volume is described hereinafter.

It is assumed that, in the historical record data, the sample capacity of the traffic data volume is n, and $\{x_1, x_2, x_3, \ldots, x_n\}$ are sequential statistics of the data traffic, then the following formula (3) can be obtained.

$$\sum_{i=1}^{n} \frac{(x_i - \mu)/\sigma}{1 - \xi(x_1 - \mu)/\sigma} = \frac{n}{1 - \xi} \quad \text{Formula (3)}$$

$$\sum_{i=1}^{n} \ln[1 - \xi(x_i - \mu)/\sigma] = -n\xi \quad \text{Formula (4)}$$

The smallest sample x1 is selected as a value of the position parameter $\mu$, and then the scale parameter $\sigma$ and the shape parameter $\xi$ may be determined. In addition, in a case that the sample is small, in order to improve the reliability of the estimated position parameter $\mu$, the position parameter $\mu$ can be re-estimated after determining the scale parameter $\sigma$ and the shape parameter $\xi$ and a stable parameter value may be obtained through such iterations. The shape parameter $\xi$ can represent a changing rate of the traffic volume.

It should be noted that the parameter related to a changing rate of a spectrum bandwidth used by the mobile access point and the method for calculating the parameter in the embodiment of the present disclosure are not limited to the above examples.

In a case that the parameter related to the behavior characteristic of the mobile access point includes the parameter related to the changing, rate of the traffic volume, according to an embodiment the determining unit 113 may be configured to: for a mobile access point having a changing rate of data traffic higher than a predetermined level, reduce an access frequency to the spectrum access system, thereby reducing the number of accesses to the SAS.

In the above exemplary embodiment, the determining unit 113 determines an access manner to the spectrum access system based on the parameters acquired by the acquiring unit 111. In addition, the determining unit 113 may also determine a spectrum allocation manner for the mobile access point based on the parameter acquired by the acquiring unit 111.

According to an embodiment, the determining unit 113 may be configured to: determine the similarity between a first mobile access point and a second mobile access point based on the parameter for the first mobile access point and the parameter for the second mobile access point acquired by the acquiring unit 111; and determine, according to a previously determined spectrum allocation scheme of one of the first mobile access point and the second mobile access point, a spectrum allocation scheme of the other of the first mobile access point and the second mobile access point, in a case where the determined similarity is higher than a predetermined level.

In other words, the spectrum allocation scheme of a target mobile access point can be determined by referring to the spectrum allocation scheme of another mobile access point similar to the target mobile access point, thereby reducing the overhead of the SAS.

An example of a method for calculating the similarity between mobile access points is described hereinafter.

The similarity between mobile access points can be defined as:

$$\theta_{sim}(i, j) = \omega_0 \text{Sgn}(B_{max}^i - B_{max}^j) + \omega_1 \left( \frac{\vec{v_i} \cdot \vec{v_j}}{\|\vec{v_i}\|\|\vec{v_j}\|} \right) \quad \text{Formula (5)}$$

$\theta_{sim}(i,j)$ represents the similarity of a mobile access point j relative to a mobile access point i. In formula (5), $\omega_0$ and $\omega_1$ are weights, and $\omega_0+\omega_1=1$, for example, $\omega_0$ and $\omega_1$ may be respectively set to 0.5. Sgn(*) represents a symbolic function. $B_{max}$ represents a maximum bandwidth required by the mobile access point.

The first part of the right side of formula (5) represents whether a maximum bandwidth required by mobile access point j exceeds a maximum bandwidth required by mobile access point i. If the maximum bandwidth required by mobile access point j exceeds the maximum bandwidth required by mobile access point i, the symbolic function returns −1, otherwise the symbolic function returns 1. This is because if the maximum bandwidth required by the new added mobile access point does not exceed the maximum bandwidth required by the original access point, the original allocated bandwidth is already substantially sufficient.

The $\vec{v_i}$ and $\vec{v_j}$ in the second part of the right side of the formula (5) are the feature vectors of the location transfer probability matrices of the mobile access point i and the mobile access point j, that is, the $\{\lambda_1, \lambda_2, \ldots, \lambda_n\}$ mentioned above. Based on this, it can be indicated whether the SASs frequently accessed by two mobile access points are the same SAS.

In a case where the weights maintain initial values, for example, it may be considered that similarity between the mobile access points is high in a case where the similarity of the mobile access points exceeds 0.75, and similarity between the mobile access points is very high in a case where the similarity of the mobile access points exceeds 0.9. Moreover, a similar spectrum allocation scheme may be determined accordingly.

It is to be noted that the embodiments of the present disclosure are not limited to the details in the above examples.

In the above examples the spectrum allocation scheme is determined based on the similarity of the two mobile access points. In addition, multiple mobile access points may also be classified based on the parameters related to behavior characteristics of the mobile access points, and similar access manners and/or similar spectrum allocation manners are applied to the same type of the mobile access points.

According to an embodiment, the determining unit 113 may be configured to classify the mobile access points based on the parameter related to the mobility and/or the parameter related to a changing rate of a spectrum bandwidth required, and determine the access manner and/or the spectrum allocation manner for each type of mobile access points.

An exemplary method of clustering mobile access points is described hereinafter.

First, the normalized eigenvalues of the location transfer probability matrix of the mobile access points are calculated, and absolute values of the normalized eigenvalues are obtained and are summed to obtain the parameter represented by the above formula (2). The parameter can reflect overhead of spectrum management implemented by the spectrum management device caused by the mobility of the mobile access point (for example, spectrum resources need to be reallocated for different locations, or an interference pattern used by the coexistence management unit changes due to a change in the location).

In addition, the shape parameter in the generalized Pareto distribution may be obtained as described above in conjunction with formulas (3) and (4). If the parameter is greater than 0.5, the average of the bandwidth requited by the mobile access point does not converge. If the parameter is greater than 1, the variance of the bandwidth required by the mobile access point does not converge.

Next according to actual system configuration, the mobile access point may report, for example, information on the above parameters to the spectrum management device.

Figure 12:
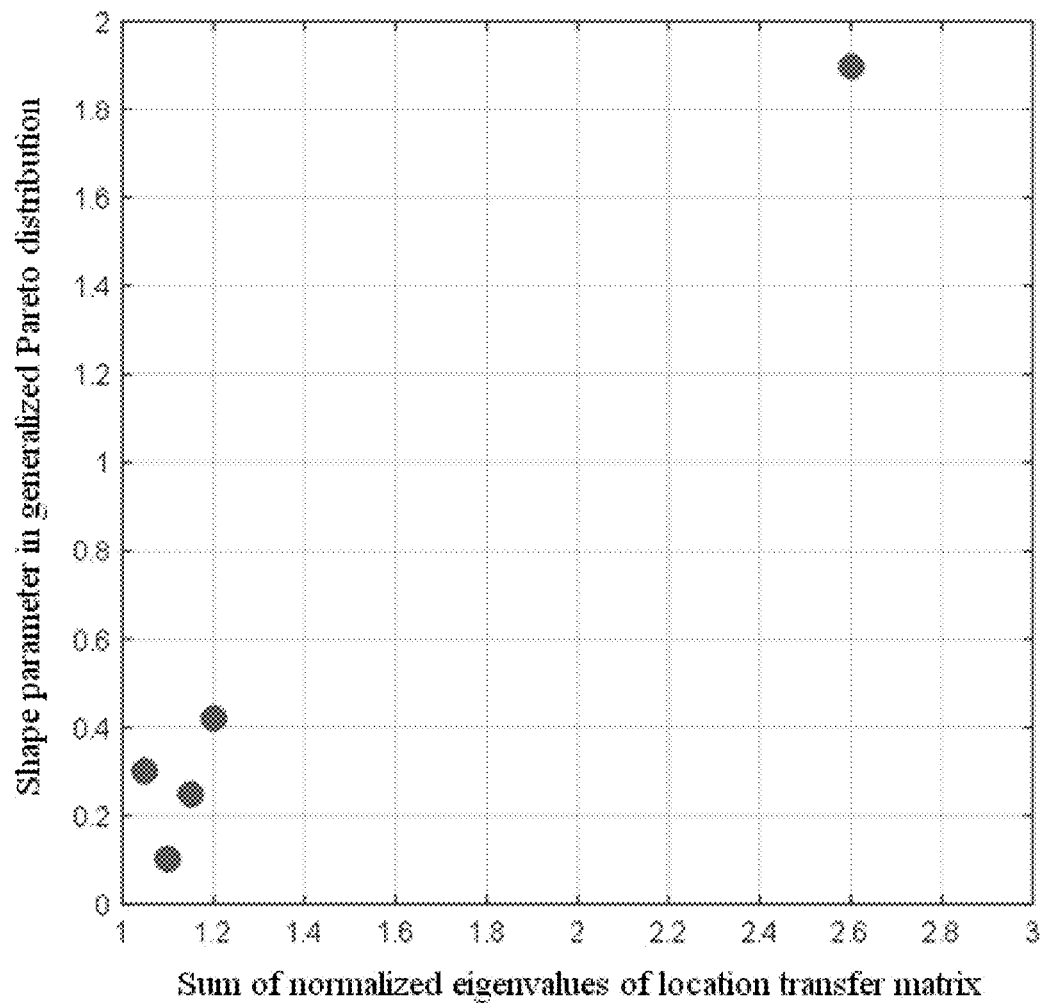
FIG. 12 shows an example of a clustering of mobile access points.

The spectrum management device (such as the CxM or the SAS, depending on the system configuration) can integrate the information on the parameters reported by the mobile access points (such as CBSD), and cluster mobile access points according to the integrated parameters. FIG. 12 shows an example of a clustering result, in which, the abscissa and the ordinate respectively correspond to the sum (the parameter related to mobility) of the normalized eigenvalues of the location transfer matrix and the shape parameter (the parameter related to the changing rate of the traffic volume) in the generalized Pareto distribution. In the example shown in FIG. 12, the mobile access points denoted as four dots in the lower left corner can be classified into the same type, and the mobile access point denoted as one dot in the upper right corner can be classified into another type.

For example, according to a record of CBSD (the record may include, for example, a CBSD ID, a flag bit (which is used for, for example, indicating a time period, etc.), a CBSD location, a CBSD moving speed, data traffic from a last time stamp to a present time stamp, and a time stamp, etc.), the shape parameter of the probability density function of the traffic and the sum of the normalized eigenvalues of the location transfer matrix may be calculated. Then the characteristics of the CBSD are analyzed according to whether the shape parameter is greater than 1 and the sum of the normalized eigenvalues is greater than 2, and an analysis result indicates whether the mobility is high and whether the changing rate of the data traffic required is high. For example, four types of users can be obtained by matching the mobility and the changing rate in various cases, that is a mobile access point with low mobility and a stable change in data traffic required, a mobile access point with high mobility and a stable change in data traffic required, a mobile access point with low mobility and a drastic change in data traffic required, and a mobile access point with high mobility and a drastic change in data traffic required. The corresponding processing can be performed for different types of users.

In addition, if the mobile access points which cause large overhead are located in a management area of the same SAS, the spectrum management devices (such as the CxM) corresponding to the SAS may coordinately allocate a same or similar spectrum to avoid or reduce overhead caused by reallocation for spectrum resources, or reserve a spectrum for the mobile access points to reduce the number of making requests, thereby reducing overhead of the system. If the mobile access points which cause large overhead are located in management areas of multiple SASs, each of the spectrum management devices (such as CxM) corresponding to the multiple SASs may respectively query currently available spectrums from SASs, and determine an overlapping spectrum between the available spectrums based on information returned by the SAS. If there is an overlapping spectrum the overlapping spectrum may be set as a public available channel, which may be allocated to the mobile access points. If there is no overlapping spectrum, for example, a channel which is currently used less frequently may be used as a public available channel. The mobile access points which cause large overhead can be set to use only the public available channel, thereby reducing information interaction with SAS during switching.

On the other hand, for mobile access points which do not cause excessive overhead of the system, the spectrum can be applied more intelligently by predicting the data traffic requirements of the mobile access points, which reduces the number of applying spectrum and the number of querying the SAS database, thereby reducing overhead of the system caused by these mobile access points.

In addition, since generally a spectrum is randomly allocated to a newly added mobile access point, the mobile access point may access to the SAS multiple times due to an inappropriate spectrum allocated to the mobile access point, which increases overhead of the system. Therefore, for the newly added mobile access point, similarity between the newly added mobile access point and the mobile access points corresponding to the existing scheme can be calculated based on a behavior model parameter of the newly added mobile access point, and spectrum similar to that of the mobile access point corresponding to similar behavior characteristics to the newly added mobile access point is allocated to the newly added mobile access point. For example, if the similarity between the newly added CBSD and the CBSD corresponding to the existing allocation scheme exceeds a similarity threshold, the spectrum allocation scheme can be formulated for the newly added CBSD according to the existing allocation scheme, thereby reducing the overhead caused by formulating the spectrum allocation scheme by the spectrum management device (such as SAS or CxM).

In the conventional technology, the CBSD periodically access to the SAS, which results in large overhead. According to an embodiment of the present disclosure, different types of mobile access points may be determined after analysis for behavior characteristic. In particular, for the CxM or the SAS to which the user with high mobility accesses frequently, a same spectrum may be allocated, to avoid the CBSD from frequently applying a spectrum when the CBSD switches frequently between different CxMs or SASs, thereby reducing overhead of the system.

Accordingly, according to an embodiment, the parameters acquired by the acquiring unit 111 may further include information related to the spectrum management device accessed by the mobile access point, and the determining unit 113 may be further configured to determine spectrums which are at least partially the same, for the predetermined number of spectrum management devices to which the mobile access point accesses with a high frequency.

In addition, for a CBSD with a low change rate in data traffic (traffic is stable), a future requirement of the CBSD may be predicted a spectrum is applied and heartbeat of the CBSD (that is, a period of accessing the SAS) is extended, thereby reducing the number of applying spectrum from the SAS by the CBSD. For a CBSD with a quick change in data traffic, for example if there is no incumbent access user in the CBSD, the heartbeat of the CBSD can be extended and the number of applying the spectrum may be limited to reduce the number of applications of the CBSD received by the SAS.

Accordingly, according to an embodiment, a traffic requirement of the mobile access point may be predicted, and a spectrum request is made based on the predicted traffic requirement.

Figure 2:
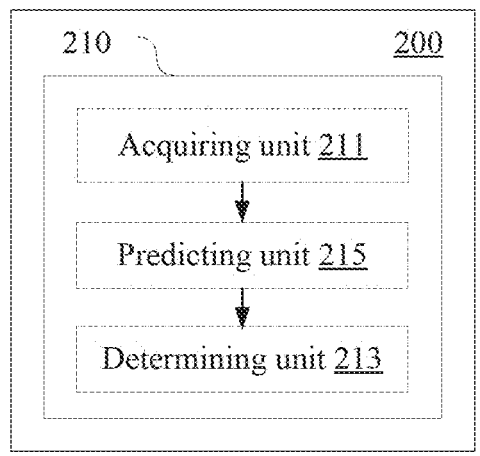
FIG. 2 is a block diagram showing a configuration example of an electronic device for wireless communication according to another embodiment.

As shown in FIG. 2, an electronic device 200 for wireless communication according to an embodiment includes a processing circuitry 210. The processing circuitry 210 includes an acquiring unit 211, a determining unit 213 and a predicting unit 215. The acquiring unit 211 and the determining unit 213 have similar configurations to the corresponding units in the embodiment described with reference to FIG. 1.

The predicting unit 215 is configured to predict a traffic requirement of the mobile access point based on the parameter acquired by the acquiring unit 211.

The determining unit 213 is further configured to determine a request for a spectrum with a width corresponding to the traffic requirement based on the traffic requirement predicted by the predicting unit 215.

Furthermore, according to another embodiment, dwell time may be predicted. The dwell time can be directly used as a permission expiration time of a spectrum in the SAS, thereby reducing overhead caused by periodic synchronization of a constant permission expiration time of the spectrum.

The embodiment is described also with reference to FIG. 2. An electronic device 200 for wireless communication according to the embodiment includes a processing circuitry 210. The processing circuitry 210 includes an acquiring unit 211, a determining unit 213 and a predicting unit 215. The acquiring unit 211 and the determining unit 213 have similar configurations to the corresponding units in the embodiment described with reference to FIG. 1.

The predicting unit 215 is configured to predict dwell time of the mobile access point in a current area based on the parameter acquired by the acquiring unit 211.

The determining unit 213 is further configured to determine, based on the dwell time predicted by the predicting unit 215, a permission expiration tune of a spectrum allocated to the mobile access point.

In the existing mobility model of the mobile access point, dwell time of the mobile access point in an area is generally not take into account, or simply only a movement time is taken into account. However, the inventors of the present disclosure have realized that the dwell tune is also important for spectrum allocation in the SAS/CxM.

In addition, the area described here may include a management area of the CxM. Correspondingly, the dwell time may refer to dwell time of the CBSD in the management area of the CxM.

Figure 9:
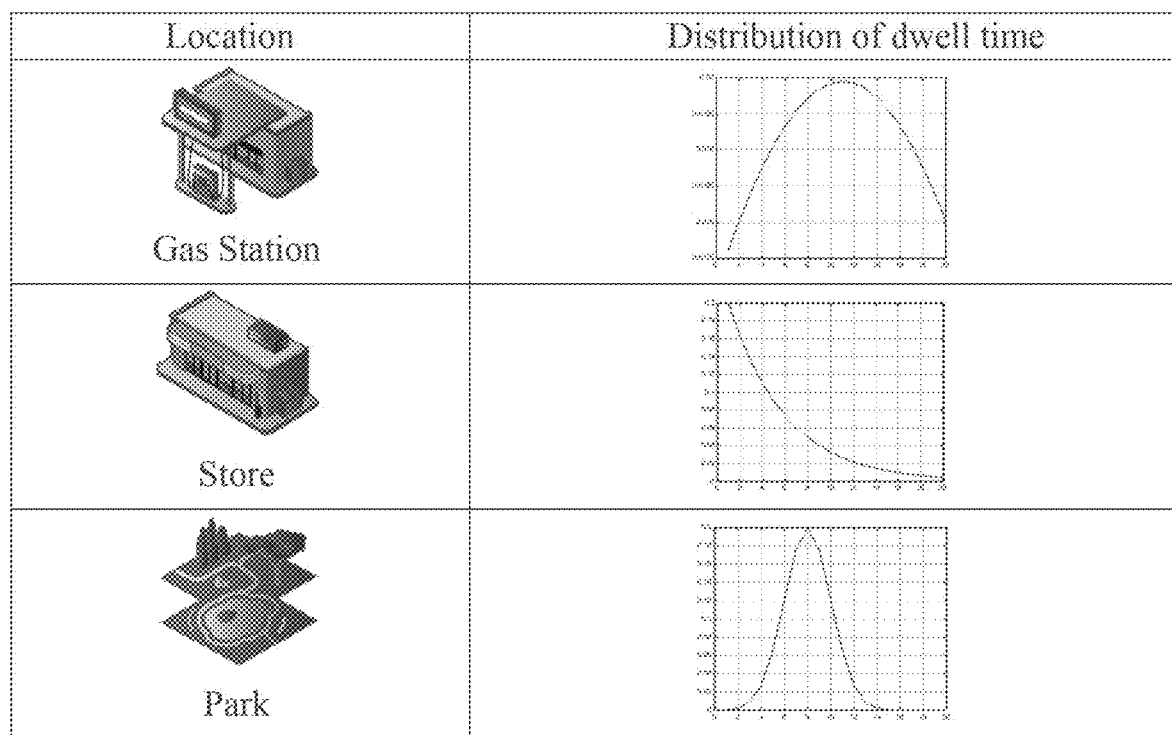
FIG. 9 shows examples of a distribution of dwell time at different locations.

A probability distribution of the dwell time may be estimated according to historical behaviors of the mobile access point (FIG. 9 shows examples of a distribution of the dwell time at different locations), and the shortest dwell time under a certain probability can be estimated.

It should be noted that the schemes of the above embodiments can be combined. For example, an overall flow chart is shown in FIG. 7, in which various aspects of the above embodiments are included.

Figure 7:
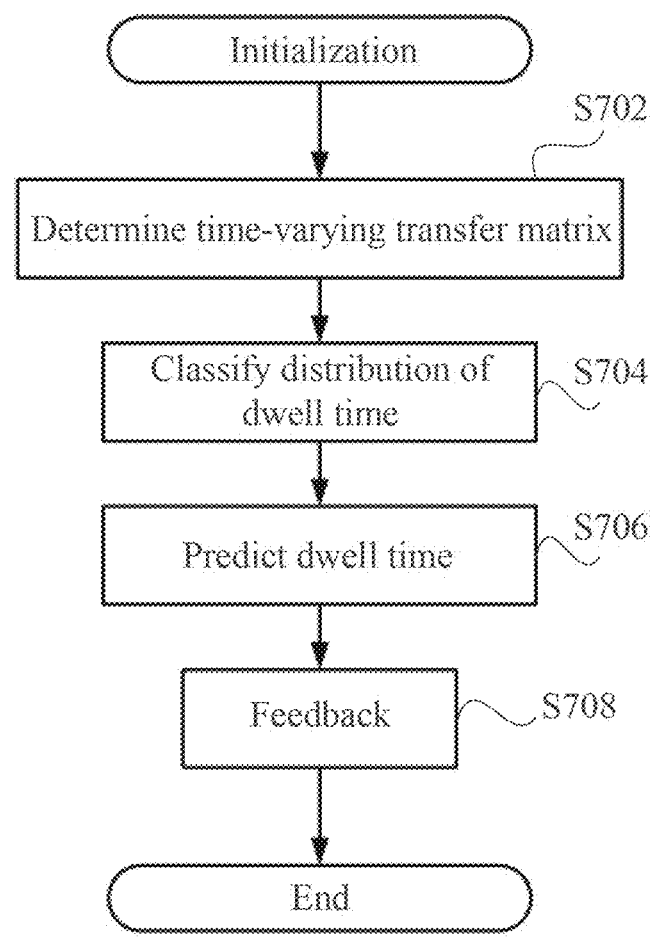
FIG. 7 is a flow chart showing an overall process of an exemplary embodiment.

As shown in FIG. 7, in step S702, a time-varying transfer matrix is determined. For example, the order (which is equivalent to the number of different spectrum management devices accessed by the mobile access point in a previous time period, or different locations of the mobile access point within a management range of a same spectrum management device) of a location transfer probability matrix on the mobile access point may be determined based on a local record of the mobile access point.

In addition, a requirement model (that is, data traffic volume of the mobile access point) of traffic data of the mobile access point at different times may be formulated according to, for example, a local record of the mobile access point. The record is fitted according to die generalized Pareto distribution.

In step S704, dwell time are classified to obtain a distribution of the dwell time. For example, access time when the mobile access point accesses to different spectrum management devices or access time when the mobile access point accesses to different locations within the management range of a same spectrum management device may be calculated according to a local record of the mobile access point, and then a distribution of access time may be fined to obtain a probability distribution of dwell time of the mobile access point in different spectrum management devices or different locations within the management range of a same spectrum management device, and obtain a corresponding cumulative distribution function (for example, as shown in FIG. 9).

In step S706, dwell time is predicted.

Through the above series of processing, a location where the mobile access point is most likely in a next synchronization period, a spectrum bandwidth under a certain probability, and dwell time under a certain probability may be predicted.

In step S708, the above information may be fed back to the spectrum management device.

Figure 10:
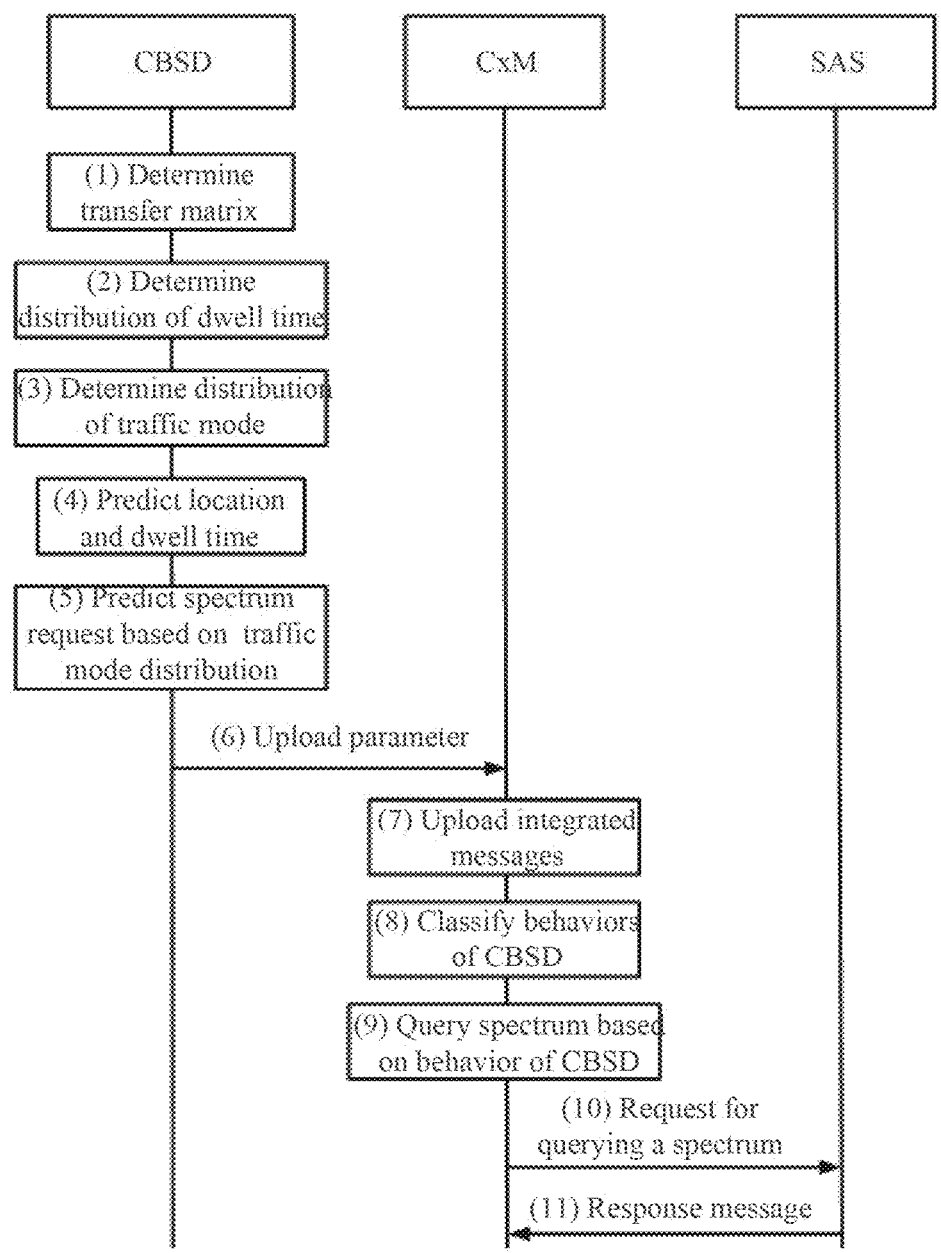
FIG. 10 is a signaling flow chart of an SAS access process in an exemplary embodiment.

FIG. 10 shows an interaction diagram of a signaling corresponding to the above processing.

Specifically, processing performed on the CBSD side may include: (1) determining the transfer matrix: (2) determining a distribution of the dwell time: (3) determining a distribution of the traffic mode; (4) predicting a location and dwell time; (5) predicting a spectrum request based on the distribution of traffic mode; and (6) uploading the parameters to the CxM.

Processing performed on the CxM side may include: (7) integrating the uploaded messages; (8) classifying behaviors of the CBSD; (9) querying a spectrum based on behaviors of the CBSD; and (10) sending a request of querying a spectrum to the SAS.

Then, in processing (11), the SAS may send a response message to the CxM.

It should be noted that the processing performed by the CxM and the SAS may be combined and performed by one (for example the CxM or the SAS) of the CxM and the SAS As mentioned above, the electronic device according to the embodiment may be implemented on the spectrum management device side or on the mobile access point side.

According to an embodiment, the electronic device is arranged on the spectrum management device side, and is configured to receive parameters from the mobile access point.

Figure 3:
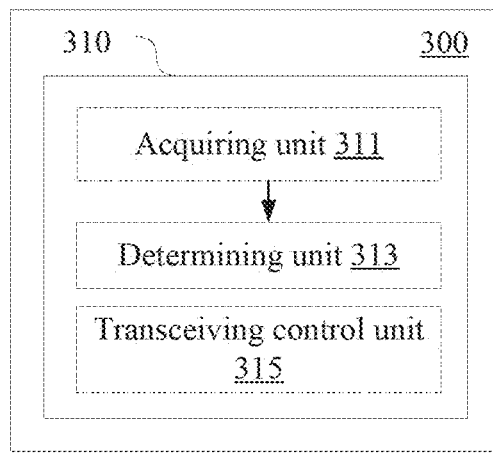
FIG. 3 is a block diagram showing a configuration example of an electronic device for wireless communication according to yet another embodiment.

As shown in FIG. 3, an electronic device 300 for wireless communication according to the embodiment includes a processing circuitry 310. The processing circuitry 310 includes an acquiring unit 311, a determining unit 313 and a transceiving controlling unit 315. The acquiring unit 311 and the determining unit 313 have similar configurations to the corresponding units in the embodiment described with reference to FIG. 1.

The transceiving controlling unit 315 is configured to perform control to receive parameters from the mobile access point. The received parameters may be provided to the acquiring unit 311.

According to another embodiment, the electronic device is arranged on the mobile access point side, and is configured to inform the spectrum management device of the determined access manner and/or the determined spectrum allocation manner.

Still referring to FIG. 3, an electronic device 300 for wireless communication according to the embodiment includes a processing circuitry 310. The processing circuitry 310 includes an acquiring unit 311, a determining unit 313 and a transceiving controlling unit 315. The acquiring unit 311 and the determining unit 313 have similar configurations to the corresponding units in the embodiment described with reference to FIG. 1.

The transceiving controlling unit 315 is configured to perform control to inform the spectrum management device of the access manner and/or spectrum allocation manner determined by the determining unit 313.

In the above embodiments, a behavior model of the mobile access point is established by the behaviors of the mobile access point, and the mobility and a traffic flow mode of the mobile access point are predicted in addition, different spectrum management units can interact and share the behavior characteristic parameters of the mobile access point, and design an optimized access strategy based on the behavior characteristic parameters, to reduce overhead of the system.

In addition, the embodiments of the present disclosure may have one or more of the following advantages.

A future location of the mobile access point, dwell time of the mobile access point in the location and a requirement of the mobile access point can be predicted based on the behavior characteristics of the mobile access point.

The mobile access points which cause large overhead can be identified without additionally increasing the overhead of the SAS.

Overhead caused by multiple requests for a spectrum in a case that the mobile access point with high mobility switches between management areas of different spectrum management devices (such as the SAS or the CxM) can be avoided.

The rationality of applying the spectrum by the mobile access point is improved, so as to meet the requirements of the mobile access point thereby reducing overhead of the system.

The effect of the embodiments of the present disclosure is further described hereinafter in conjunction with a simulation result.

Figure 11:
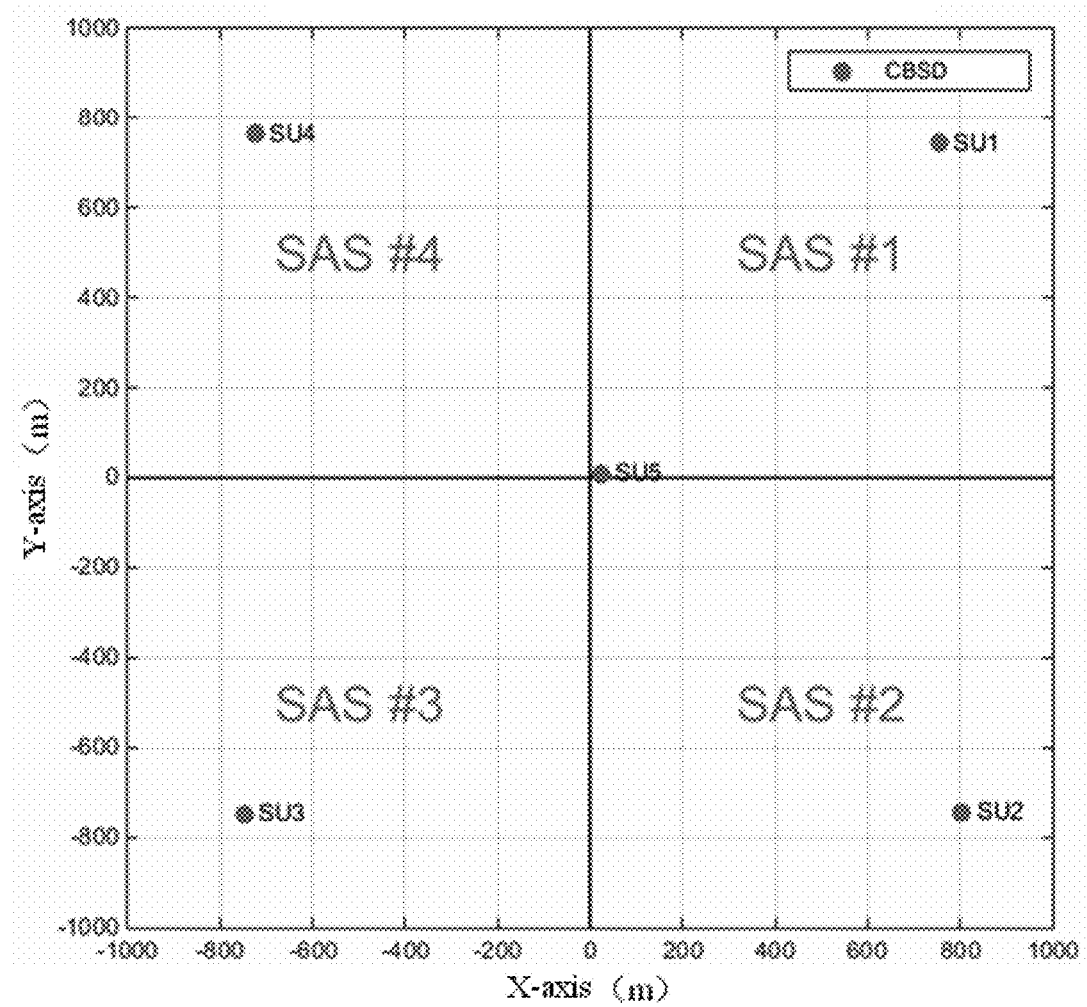
FIG. 11 is a schematic diagram showing a simulation scenario.

To verify performance of the proposed solution, a spectrum access system of 3.5 GHz is selected as a simulation scenario. In this scenario, there are a large number of historical behavior records of the mobile access point for modeling the behavior characteristics of the mobile access points. Specifically, five mobile access points are distributed in an area of 2000 m×, and it is assumed that there are four SAS databases (SAS#1 to SAS#4) in the area. Each of the SAS databases has a spectrum management device (CXM) for managing a same area, and one of the mobile access points has high mobility. It should be noted that FIG. 11 only shows a distribution of mobile access points in all of the SAS area at a certain moment. In the simulation, a location of each of the mobile access points dynamically changes.

In addition, parameters used in the simulation are shown in the following Table 1.

TABLE 1

| Parameters | Values |
| --- | --- |
| The number of SAS databases | 4 |
| The number of CBSDs | 5 |
| The number of simulations | 100 |
| Duration of single simulation | 3 hours |
| Update time of CBSD-SAS | 2 minutes |

The number of accessing to the SAS by multiple CBSDs in a time period is simulated. In order to verify stability and validity of the algorithm, the number of accessing the SASs in a same time period is counted based on movement trajectories of the different CBSDs. Therefore, multiple ("the number of simulations" in the above Table) simulations are performed, in which, each simulation corresponds to a movement trajectory of the CBSD within a certain time period ("duration of single simulation" in the above Table).

FIG. 12 shows a result of clustering the mobile access points according to the overhead (the abscissa represents the sum of the normalized eigenvalues of the location transfer matrix of the mobile access point) caused by the mobility of the mobile access point and the overhead caused by a requirement change of the mobile access point (the ordinate represents the shape parameter in the generalized Pareto distribution). The overhead of the mobile access point increases with a decrease in a distance of the mobile access point to the right upper side. The mobile access point which causes large overhead can be determined with this method.

Figure 13:
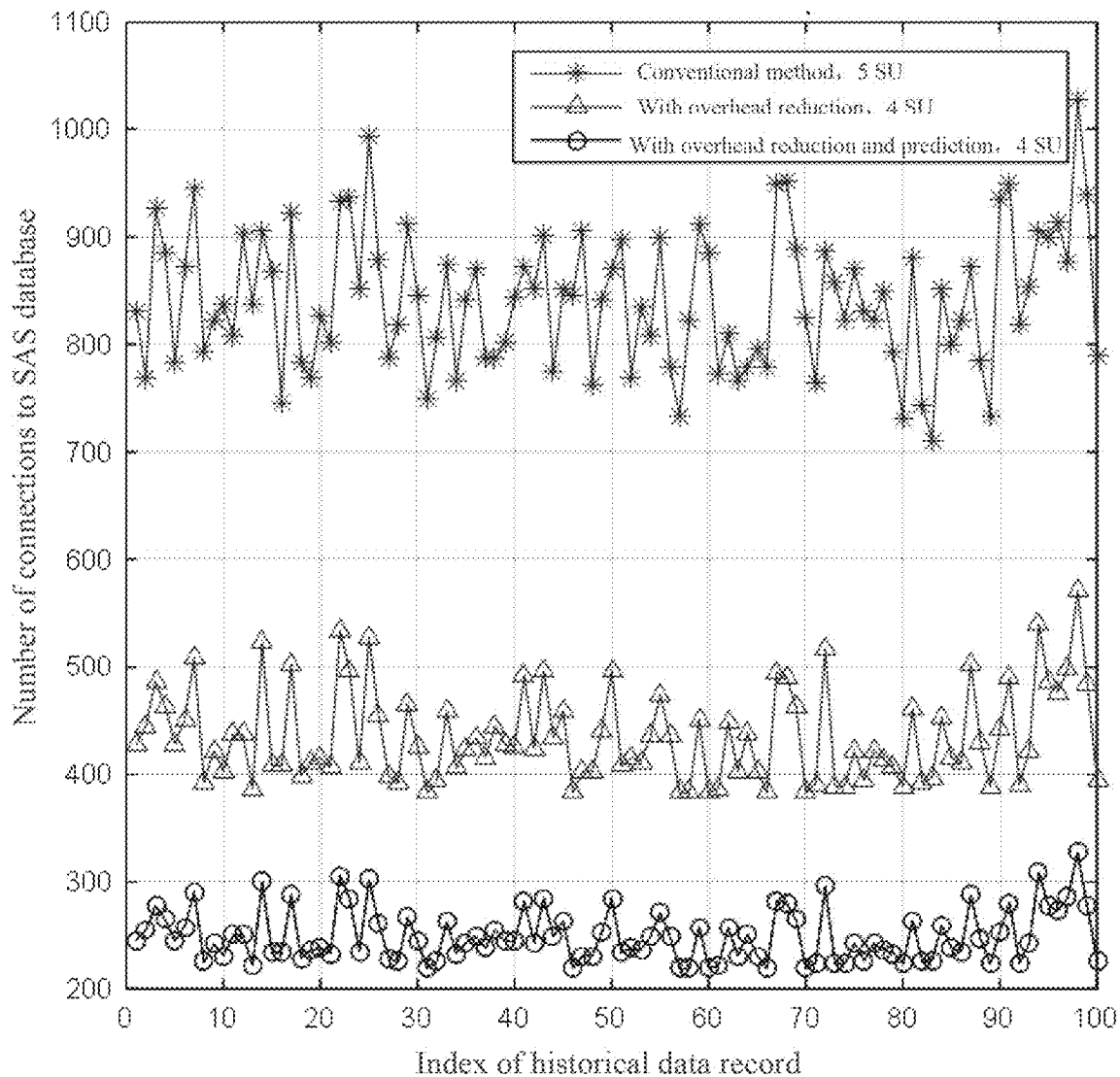
FIG. 13 shows a simulation result for the number of connecting the SAS.

FIG. 13 shows a simulation result for the number of connecting the SAS. It can be seen from the simulation result that, as compared with the strategy of reducing overhead, the number of accessing to the SAS database is significantly reduced in the strategy of reducing the overhead, thereby reducing overhead of the SAS system. In addition, the number of accessing to the SAS database can be further reduced in the case of performing prediction.

During the above process of describing the device embodiments, some processes and methods are also disclosed apparently. Hereinafter, a wireless communication method according to an embodiment of the present disclosure is described without repeating details described above.

Figure 4:
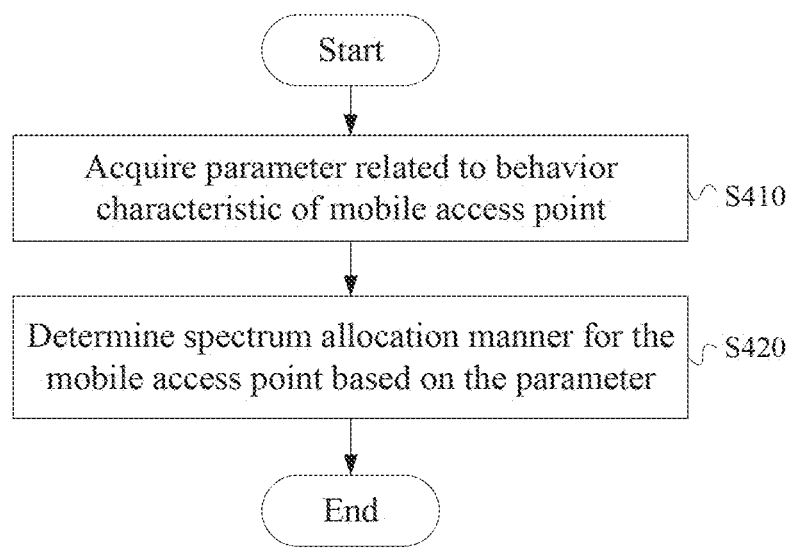
FIG. 4 is a flow chart of a process example of a wireless communication method according to an embodiment of the present disclosure.
Figure 5:
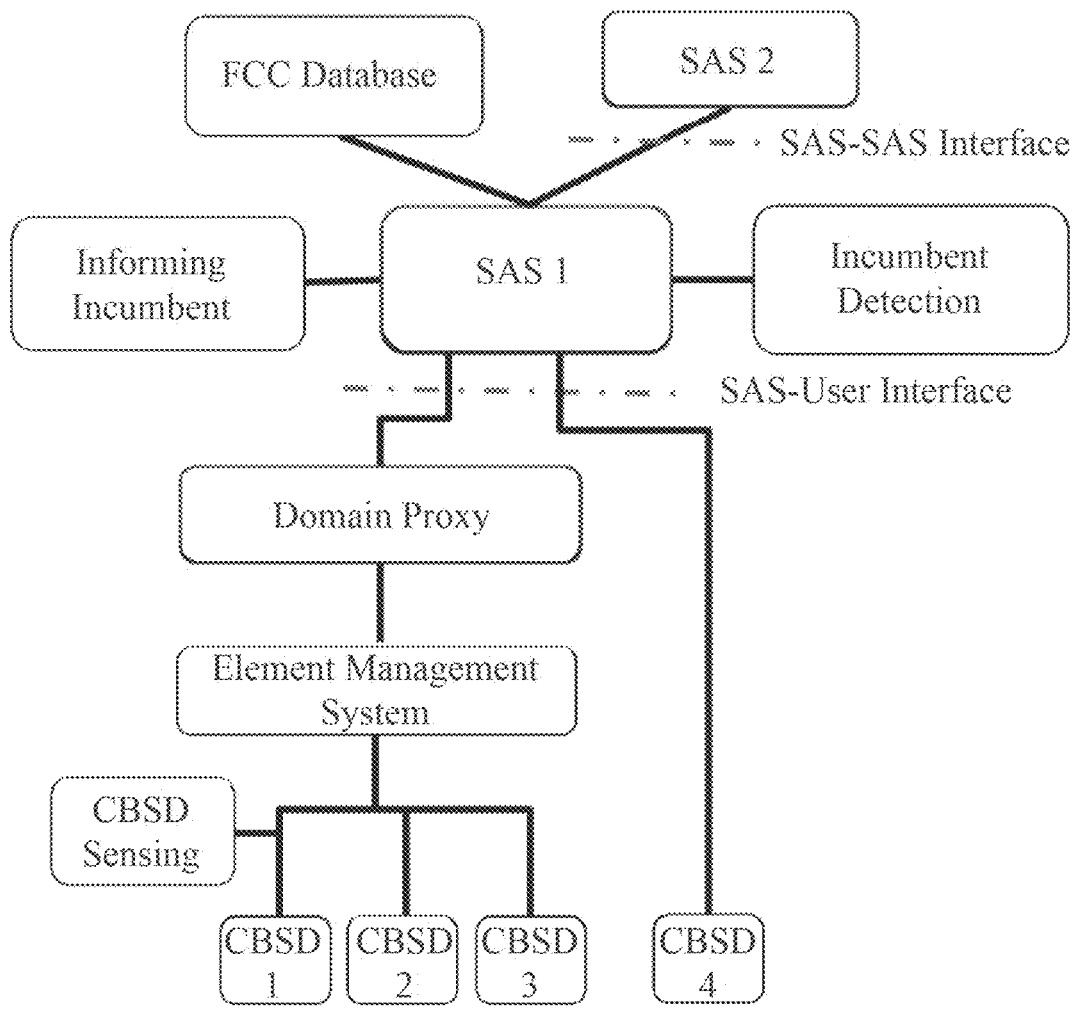
FIG. 5 is a block diagram showing an exemplary structure of an SAS.

As shown in FIG. 4, a wireless communication method according to an embodiment includes step S410 of acquiring a parameter related to a behavior characteristic of a mobile access point, and step S420 of determining a spectrum allocation manner for the mobile access point based on the parameter. Furthermore, a wireless communication method according to an embodiment may further include a step of determining an access manner to the spectrum access system based on the parameter.

The above parameters may be include a parameter related to mobility of the mobile access point and/or a parameter related to a changing rate of a spectrum bandwidth used by the mobile access point.

More specifically, the parameter related to the mobility may include a normalized eigenvalue of a transfer matrix of a mobile access point. Elements of the transfer matrix correspond to probabilities of transferring of the mobile access point between spectrum management devices. The parameter related to the changing rate includes a shape parameter of a probability distribution of a traffic requirement of the mobile access point.

In addition, a computer readable medium is further provided according to an embodiment of the present disclosure, which includes executable instructions. When executed by an information processing apparatus, the executable instructions cause the information processing apparatus to execute the wireless communication method according to the embodiments of the present disclosure.

As an example, various steps of the above methods and various composition modules and/or units of the above apparatuses may be implemented as software, firmware, hardware or a combination thereof. In the case where the prevent disclosure is realized by software or firmware, a program constituting the software for implementing the above method is installed in a computer with a dedicated hardware structure (e.g. a general computer 2000 shown in FIG. 14) from a storage medium or a network. The computer is capable of implementing various functions when installed with various programs.

Figure 14:
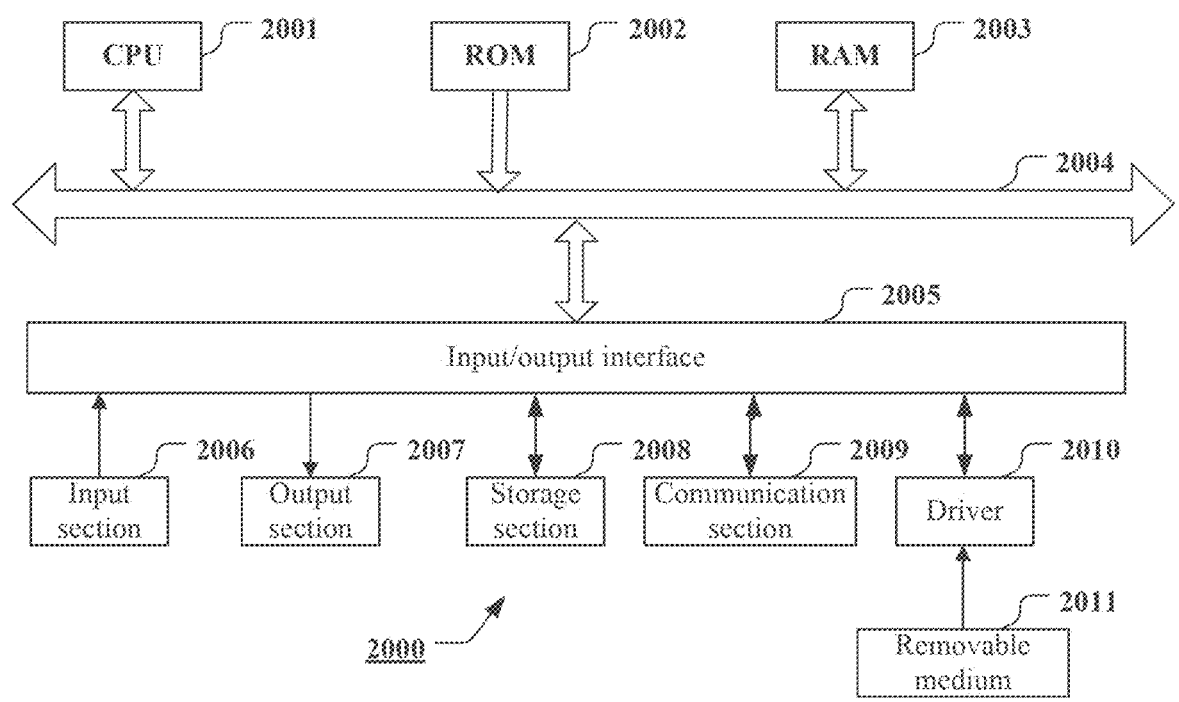
FIG. 14 is a block diagram showing an exemplary structure of a computer for implementing a method and an apparatus according to the present disclosure.

In FIG. 14, a central processing unit (i.e., CPU) 2001 executes various processing according to a program stored in a read only memory (ROM) 2002 or a program loaded to a random access memory (RAM) 2003 from a storage section 2008. The data for the various processing of the CPU 2001 may be stored in the RAM 2003 as needed. The CPU 2001, the ROM 2002, and the RAM 2003 are linked to each other via a bus 2004. An input/output interface 2005 is also linked to the bus 2004.

The input/output interface 2005 is linked to an input section 2006 (including a keyboard a mouse and so on), an output section 2007 (including a display such as a cathode ray tube (CRT) and a liquid crystal display (LCD), a loudspeaker and so on), a storage section 2008 (including a hard disk), and a communication section 2009 (including a network interface card such as a LAN card, a modem and so on). The communication section 2009 performs communication processing via a network for example the Internet. A driver 2010 may also be connected to the input/output interface 2005 if needed. A removable medium 2011, such as a magnetic disk, an optical disk, a magneto-optical disk and a semi-conductor storage, is mounted on the driver 2010 as needed, so that a computer program read from the removable medium 1511 is loaded to the storage unit 2008 as needed.

In a case of the series of processing described above are realized with software, programs consisting of the software are installed from the network such as the Internet or the storage medium such as the removable medium 2011.

Those skilled in the art should understand that the storage medium is not limited to the removable medium 2011 shown in FIG. 14 which stores programs therein and is distributed separately from the device to provide the programs to the user. The removable medium 2011 may be for example, a magnetic disc (including a floppy disc (registered trademark)), a compact disc (including a compact disc read-only memory (CD-ROM) and a digital versatile disc (DVD)), a magneto optical disc (including a mini disc (MD) (registered trademark)), and a semiconductor memory. Alternatively, the storage medium may be a ROM 2002, a hard disk included in the storage section 2008 and the like, in which programs are stored and distributed to the user along with the devices containing them.

The embodiments of the present disclosure further relate to a program product in which machine-readable instruction codes are stored. The method according to the above embodiments of the present disclosure can be performed when the instruction codes are read and executed by a machine.

Accordingly, a storage medium for carrying the program product in which machine-readable instruction codes are stored is also provided in the present disclosure. The storage medium includes but is not limited to a floppy disc, an optical disc, a magnetic optical disc, a memory card, a memory stick and the like.

The embodiments of the present disclosure may further relate to the following electronic device. In a case where the electronic device is applied to the base station side, the electronic device can be implemented as any type of evolved nodes B (eNB) such as a macro eNB and a small eNB. The small eNB may be an eNB of a cell having a smaller coverage than the macro cell, such as a pico-cell eNB, a micro eNB and a home (femto) eNB. Alternatively, the electronic device may be implemented as any other types of base stations, such as a NodeB and a base transceiver station (BTS). The electronic device may include a main body (also referred to as a base station apparatus) configured to control radio communication, and one or more remote radio heads (RRH) disposed in a different place from the main body. In addition, various types of terminals, which will be described below, may each operate as the base station by temporarily or semi-persistently executing functions of the base station.

In a case where the electronic device is applied to user equipment side, the electronic device may be implemented as a mobile terminal (such as a smart phone, a tablet personal computer (PC), a notebook PC, a portable game terminal, a portable/dongle type mobile router, and a digital camera), or an in-vehicle terminal (such as a car navigation apparatus). Furthermore, the electronic device may be a radio communication module (such as an integrated circuit module including a single the or multiple dies) mounted on each of the terminals described above.

[Application Example Regarding Terminal Device]

Figure 15:
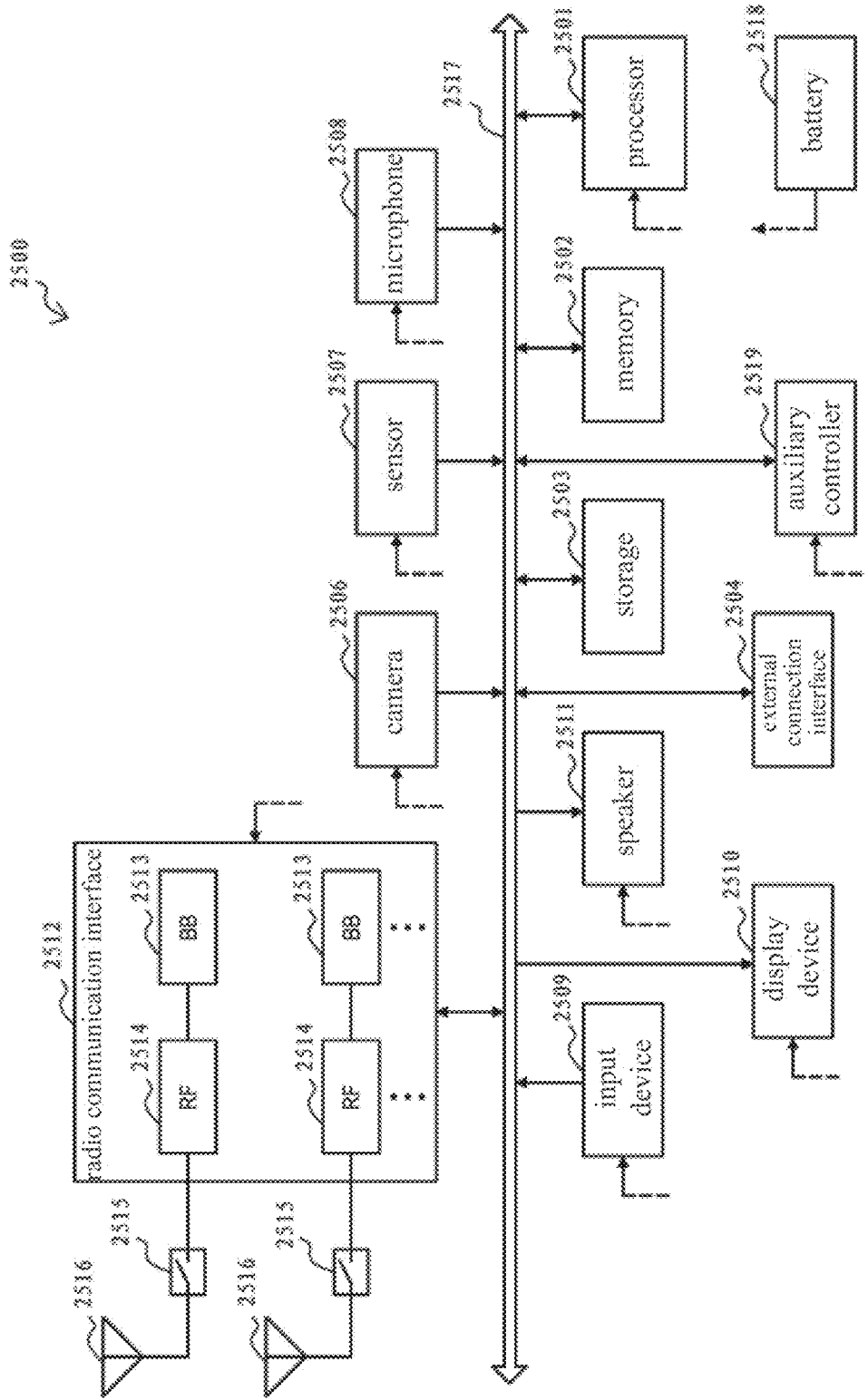
FIG. 15 is a block diagram showing an example of a schematic configuration of a smart phone to which the technology according to the present disclosure may be applied.

FIG. 15 is a block diagram showing an example of a schematic configuration of a smart phone 2500 to which the technology according to the present disclosure may be applied. The smart phone 2500 includes a processor 2501, a memory 2502, a storage 2503, an external connection interface 2504, a camera 2506, a sensor 2507, a microphone 2508, an input device 2509, a display device 2510, a speaker 2511, a radio communication interface 2512, one or more antenna switches 2515, one or more antennas 2516, a bus 2517, a battery 2518 and an auxiliary controller 2519.

The processor 2501 may be for example a CPU or a system on chip (SoC), and controls functions of an application layer and other layers of the smart phone 2500. The memory 2502 includes a RAM and a ROM, and stores data and programs executed by the processor 2501. The storage 2503 may include a storage medium such as a semiconductor memory and a hard disk. The external connection interface 2504 is an interface for connecting an external device (such as a memory card and a universal serial bus (USB) device) to the smart phone 2500.

The camera 2506 includes an image sensor (such as a charge coupled device (CCD) and a complementary metal oxide semiconductor (CMOS)), and generates a captured image. The sensor 2507 may include a set of sensors such as a measurement sensor, a gyro sensor, a geomagnetic sensor and an acceleration sensor. The microphone 2508 converts sounds that are input to the smart phone 2500 to audio signals. The input device 2509 includes, for example, a touch sensor configured to detect touch on a screen of the display device 2510, a keypad, a keyboard, a button or a switch, and receives operation or information inputted from a user. The display device 2510 includes a screen (such as a liquid crystal display (LCD) and an organic light-emitting diode (OLED) display), and displays an output image of the smart phone 2500. The speaker 2511 converts audio signals outputted from the smart phone 2500 into sounds.

The radio communication interface 2512 supports any cellular communication scheme (such as the LTE and the LTE-Advanced), and performs wireless communication. The radio communication interface 2512 may typically include, for example, a baseband (BB) processor 2513 and a radio frequency (RF) circuit 2514. The BB processor 2513 may perform for example coding/decoding, modulation demodulation and multiplexing/demultiplexing, and perform various types of signal processing for wireless communication. Also, the RF circuit 2514 may include for example a frequency mixer, a filter and an amplifier, and transmit and receive a radio signal via the antenna 2516. The radio communication interface 2512 may be a chip module on which the BB processor 2513 and the RF circuit 2514 are integrated. As shown in FIG. 15, the radio communication interface 2512 may include multiple BB processors 2513 and multiple RF circuits 2514. Although FIG. 15 shows the example in which the radio communication interface 2512 includes multiple BB processors 2513 and multiple RF circuits 2514, the radio communication interface 2512 may include a single BB processor 2513 or a single RF circuit 2514.

In addition to the cellular communication scheme, the radio communication interface 2512 may support an additional type of wireless communication scheme, such as a short-distance wireless communication scheme, a near field communication scheme and a wireless local area network (LAN) scheme. In this case, the radio communication interface 2512 may include a BB processor 2513 and an RF circuit 2514 for each of the wireless communication schemes.

Each of the antenna switches 2515 switches a connection destination of the antenna 2516 between multiple circuits (such as circuits for different wireless communication schemes) included in the radio communication interface 2512.

Each of the antennas 2516 includes one or more antenna elements (such as multiple antenna elements included in the MIMO antenna), and is for the radio communication interface 2512 to transmit and receive a wireless signal. As shown in FIG. 15, the smart phone 2500 may include the multiple antennas 2516. Although FIG. 15 illustrates the example in which the smartphone 2500 includes the multiple antennas 2516, the smartphone 2500 may also include a single antenna 2516.

Furthermore, the smartphone 2500 may include an antenna 2516 for each radio communication scheme. In this case, the antenna switches 2515 may be omitted from the configuration of the smartphone 2500.

The processor 2501, the memory 2502, the storage 2503, the external connection interface 2504, the camera 2506, the sensor 2507, the microphone 2508, the input device 2509, the display device 2510, the speaker 2511, the radio communication interface 2512 and the auxiliary controller 2519 are connected with each other through the bus 2517. The battery 2518 supplies power to blocks of the smartphone 2500 illustrated in FIG. 15 via feeder lines, which are partially shown as dashed lines in the FIG. 15. The auxiliary controller 2519, for example, operates a minimum necessary function of the smart phone 2500 in a sleep mode.

In the smart phone 2300 as shown in FIG. 15, a transceiving device of the device on user equipment side may be implemented with the radio communication interface 2512. At least a part of functions of processing circuits and/or units of the electronic device or information processing apparatus on the user equipment side may be implemented by a processor 2501 or an auxiliary controller 2519. For example, power consumption of the battery 2518 can be reduced in a case that the auxiliary controller 2519 performs a part of functions of the processor 2501. In addition the processor 2501 or the auxiliary controller 2519 may perform at least a part of the functions of the processing circuits and/or the units of the electronic device or the information processing apparatus on the user equipment side by executing programs stored in the memory 2502 or the storage 2503.

[Application Example Regarding Base Station]

Figure 16:
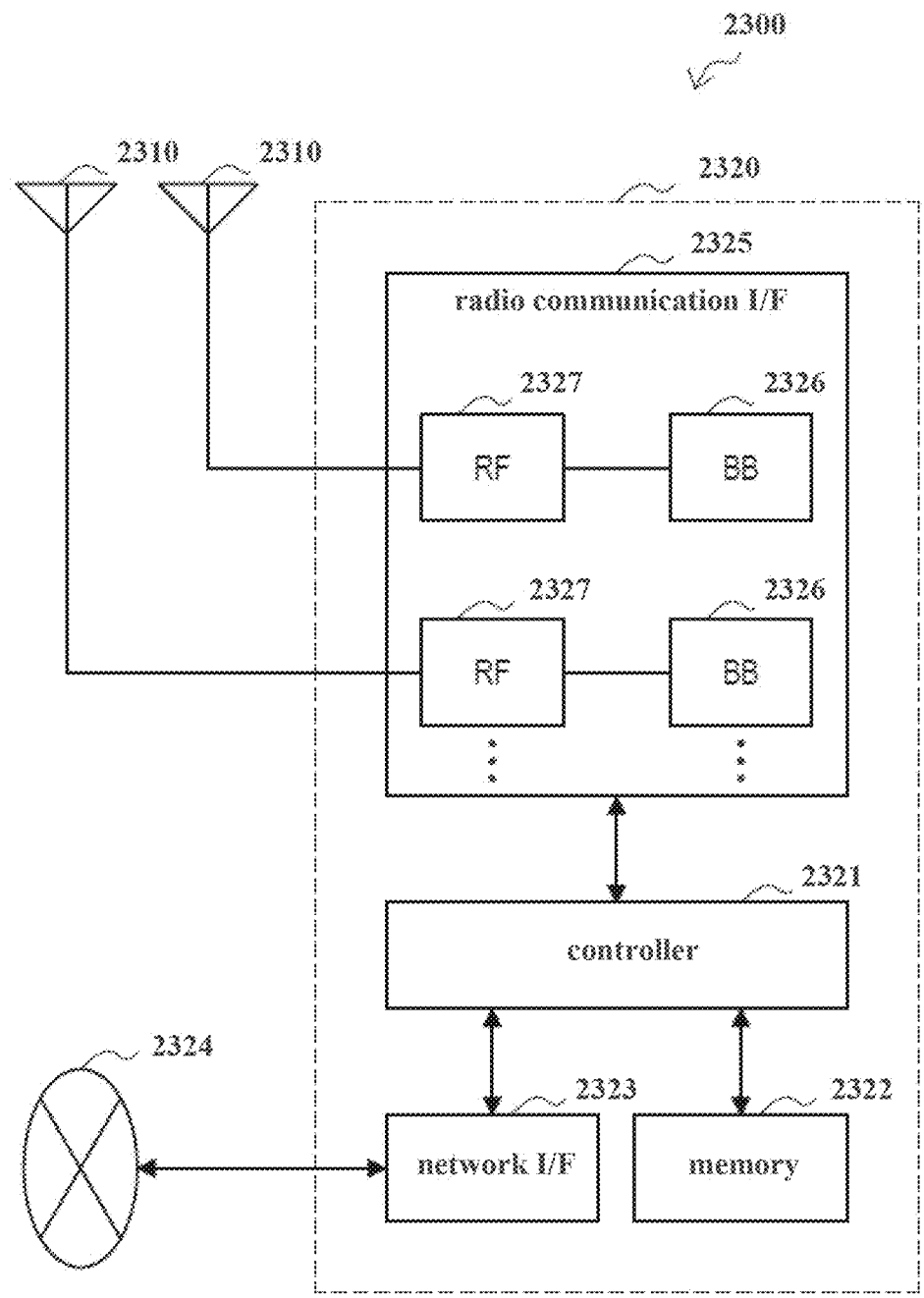
FIG. 16 is a block diagram showing an example of a schematic configuration of a gNB (a base station in the 5G system) to which the technology according to the present disclosure may be applied.

FIG. 16 is a block diagram of an example of a schematic configuration of a gNB to which the technology of the present disclosure may be applied. The gNB 2300 includes multiple antennas 2310 and a base station device 2320. The base station device 2320 and each antenna 2310 may be connected to each other via a radio frequency (RF) cable.

Each of the antennas 2310 includes a single or multiple antenna elements (such as multiple antenna elements included in a multi-input multi-output (MIMO) antenna), and is used for the base station apparatus 2320 to transmit and receive radio signals. As shown in FIG. 16, the gNB 2300 may include multiple antennas 2310. For example, the multiple antennas 2310 may be compatible with multiple frequency bands used by the gNB 2300.

The base station device 2320 includes a controller 2321, a memory 2322, a network interface 2323, and a radio communication interface 2325.

The controller 2321 may be for example, a CPU or a DSP, and operate various functions of the higher layer of the base station device 2320. For example, the controller 2321 generates a data packet based on the data in the signal processed by the radio communication interface 2325 and communicates the generated packet via the network interface 2323. The controller 2321 may bundle data from multiple baseband processors to generate bundled packets and communicate the generated bundled packets. The controller 2321 may have a logic function of the following control, for example, radio resource control, wireless bearer control, mobility management admission control, and scheduling. The control may be implemented in conjunction with a gNB or a core network node nearby. The memory 2322 includes RAM and ROM, and stores programs to be executed by the controller 2321 and various types of control data (such as a terminal list transmission power data and scheduling data).

The network interface 2323 is a communication interface for connecting the base station device 2320 to the core network 2324. The controller 2321 may communication with the core network node or another gNB via the network interface 2323. In this case, the gNB 2300 and the core network node or another gNB may be connected to each other via a logic interface (such as an S1 interface and an X2 interface). The network interface 2323 may be a wired communication interface or a radio communication interface for radio backhaul routing. If the network interface 2323 is a radio communication interface, the network interface 2323 may use a frequency band for wireless communication higher than a frequency band used by the radio communication interface 2325.

The radio communication interface 2325 supports any cellular communication scheme (such as the Long Term Evolution (LTE) and the LTE-advanced), and provides a radio connection to a terminal located in a cell of the gNB 2300 via the antenna 2310. The radio communication interface 2325 may generally include a baseband (BB) processor 2326 and an RF circuit 2327. The BB processor 2326 may perform for example encoding-decoding, modulating-demodulating and multiplexing/demultiplexing, and various types of signal processing of layers (such as the L1, the medium access control (MAC), the radio link control (RLC) and the packet data convergence protocol (PDCP)) Instead of the controller 2321. The BB processor 2326 may have a portion or all of the above logical functions. The BB processor 2326 may be a memory storing communication control programs, or a module including a processor and a related circuit which are configured to execute programs. The function of the BB processor 2326 may be changed when the programs are updated. The module may be a card or a blade embedded into the slot of the base station device 2320. Alternatively, the module may be a chip mounted on the card or the blade. Furthermore, the RF circuit 2327 may include, for example, a mixer, a filter, and an amplifier, and transmits and receives a wireless signal via the antenna 2310.

As shown in FIG. 16, the radio communication interface 2325 may include multiple BB processors 2326. For example, the multiple BB processors 2326 may be compatible with multiple frequency bands used by the gNB 2300. The radio communication interface 2325 may include the multiple RF circuits 2327, as shown in FIG. 16. For example, multiple RF circuits 2327 may be compatible with multiple antenna elements. Although FIG. 16 shows an example in which the radio communication interface 2325 includes multiple BB processors 2326 and multiple RF circuits 2327, the radio communication interface 2325 may include a single BB processor 2326 or a single RF circuit 2327.

In the gNB 2300 shown in FIG. 16, a transceiving device of the wireless communication device on the base station side may be implemented with the radio communication interface 2325. At least a part of the functions of processing circuits and or units of the electronic device or the wireless communication apparatus on the base station side may be implemented by the controller 2321. For example, the controller 2321 may perform at least a part of the functions of the processing circuits and or units of the electronic device or wireless communication apparatus on base station side by performing the programs stored in the memory 2322.

In the above description of the embodiments of the present disclosure, features that are described and/or illustrated with respect to one embodiment may be used in the same way or in a similar way in one or more other embodiments, may be combined with or replace the features of the other embodiments.

It should be emphasized that the term "include/comprise" used in this specification refers to the presence of features, elements, steps or components, but does not preclude the presence or addition of one or more other features, elements, steps or components.

In the above embodiments and examples, the steps and or the units are represented with reference numbers consists of numbers. It will be understood by those skilled in the art that these reference numerals are only for purpose of illustration and drawing and are not indicative of the order or any other limitations thereof.

In addition, the method of the prevent disclosure is not limited to be executed in the chronological order described in the specification, or may be executed in other chronological order, in parallel or independently. Therefore, the order of executing the method described in this specification does not limit the technical scope of the present disclosure.

While the present disclosure has been described above by the specific embodiments of the present disclosure, it should be understood that all embodiments and examples described above are illustrative rather than restrictive. Various modifications, improvements and equivalents can be made to the present disclosure by those skilled in the art within the scope and spirit of accompanying claims. These modifications, improvements or equivalents should fall within the protection scope of the present disclosure.

The invention claimed is:

1. An electronic device for wireless communication, comprising a processing circuitry configured to:
    acquire a parameter related to a behavior characteristic of a mobile access point, and
    determine a spectrum allocation manner for the mobile access point based on the parameter,
    wherein the parameter comprises at least one of:
        a first parameter related to a probability that the mobile access point transfers from a first spectrum management device to a second spectrum management device, or
        a second parameter corresponding to:
            a first rate of change of spectrum bandwidth usage of the mobile access point, or
            a second rate of change of spectrum bandwidth usage of the mobile access point.

2. The electronic device according to claim 1,
    wherein the first parameter comprises a normalized eigenvalue of a transfer matrix of the mobile access point, and
    wherein elements of the transfer matrix correspond to the probability of the mobile access point transferring from the first spectrum management device to the second spectrum management device.

3. The electronic device according to claim 1, wherein the second parameter comprises one of a first shape parameter of a probability distribution of a traffic requirement corresponding to the first rate of change of spectrum bandwidth usage or a second shape parameter of a probability distribution of a traffic requirement corresponding to the second rate of change of spectrum bandwidth usage.

4. The electronic device according to claim 1, wherein the processing circuitry is further configured to determine an access manner to a spectrum access system based on the at least one of the first parameter or the second parameter.

5. The electronic device according to claim 4,
    wherein the parameter comprises the second parameter,
    wherein the first rate of change of spectrum bandwidth usage corresponds to a first rate of change of data traffic higher than a predetermined level, and the second rate of change of spectrum bandwidth usage corresponds to a second rate of change of data traffic lower than the predetermined level, and
    wherein the processing circuitry is further configured to:
        when the mobile access point has the first rate of change of data traffic higher than the predetermined level, reduce an access frequency of the mobile access point to the spectrum access system.

6. The electronic device according to claim 4, wherein the processing circuitry is further configured to:
    classify the mobile access point into one of a first or second mobile access type based on the at least one of the first parameter or the second parameter, and determine a corresponding one of an access manner or a spectrum allocation manner according to the classified mobile access type.

7. The electronic device according to claim 1,
    wherein the mobile access point comprises plural mobile access points, and
    wherein the processing circuitry is further configured to:
    compare at least one of the first parameter or the second parameter of a first mobile access point with a corresponding one of the first parameter or the second parameter of a second mobile access point, to determine similarity between the first mobile access point and the second mobile access point, and
    determine, according to a previously determined spectrum allocation scheme for one of the first mobile access point or the second mobile access point, a spectrum allocation scheme for the other of the first mobile access point or the second mobile access point, in a case where the determined similarity is higher than a predetermined level.

8. The electronic device according to claim 1, wherein the processing circuitry is further configured to:
    predict a traffic requirement of the mobile access point based on the parameter, and determine a request for a spectrum with a width corresponding to the traffic requirement based on the predicted traffic requirement.

9. The electronic device according to claim 1, wherein the parameter comprises information on spectrum management devices to which the mobile access point has accessed, and the processing circuitry is further configured to:
    for a predetermined number of spectrum management devices to which the mobile access point has previously accessed with a high frequency, determine spectrums for the predetermined number of spectrum management devices which are at least partially the same.

10. The electronic device according to claim 1, wherein the processing circuitry is further configured to:
    predict a dwell time of the mobile access point in a current area based on the parameter; and
    determine, according to the predicted dwell time, a permission expiration time of a spectrum allocated to the mobile access point.

11. The electronic device according to claim 1, wherein the parameter is determined based on one or more of the following information of the mobile access point: an identifier, a position, a moving speed, time of making a spectrum request, or data traffic within a time period between spectrum requests.

12. The electronic device according to claim 1, wherein the processing circuitry is configured to:

acquire the parameter for different time periods respectively, and determine the spectrum allocation manner of the mobile access point within a target time period based on the parameter corresponding to a respective time period.

13. The electronic device according to claim 1, wherein the electronic device is arranged at a spectrum management device side, and the processing circuitry is configured to perform control to receive the parameter from the mobile access point.

14. The electronic device according to claim 1, wherein the electronic device is arranged at the mobile access point side, and the processing circuitry is configured to perform control to notify the determined spectrum allocation manner to a spectrum management device.

15. The electronic device according to claim 13, wherein the spectrum management device comprises a co-existence manager or a device provided at a spectrum access system side, and the mobile access point includes a citizen broadband radio service device or a user equipment.

16. A wireless communication method, including:

acquiring a parameter related to a behavior characteristic of a mobile access point: and determining a spectrum allocation manner for the mobile access point based on the parameter, wherein the parameter comprises at least one of:
a first parameter related to a probability that the mobile access point transfers from a first spectrum management device to a second spectrum management device, or
a second parameter corresponding to:
a first rate of change of spectrum bandwidth usage of the mobile access point, or
a second rate of change of spectrum bandwidth usage of the mobile access point.

17. The method according to claim 16, wherein
the first parameter comprises a normalized eigenvalue of a transfer matrix of the mobile access point, wherein elements of the transfer matrix correspond to the probability of transferring of the mobile access point from the first spectrum management device to the second spectrum management device, and
the second parameter comprises one of a first shape parameter of a probability distribution of a traffic requirement corresponding to the first rate of change of spectrum bandwidth usage or a second shape parameter of a probability distribution of a traffic requirement corresponding to the second rate of change of spectrum bandwidth usage.

18. A non-tangible computer readable medium comprising executable instructions that, when executed by an information processing apparatus, cause the information processing apparatus to execute the method according to claim 16.

* * * * *